April 11, 1944.     T. J. LEHANE ET AL     2,346,592
AUTOMATIC TEMPERATURE CONTROL SYSTEM
Filed May 2, 1942     3 Sheets-Sheet 1
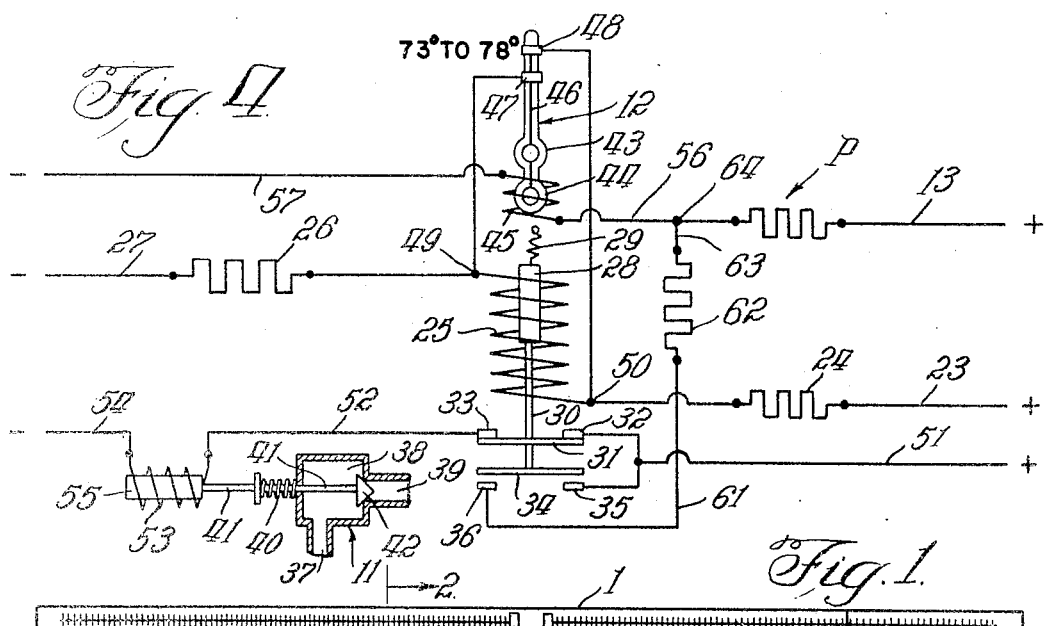
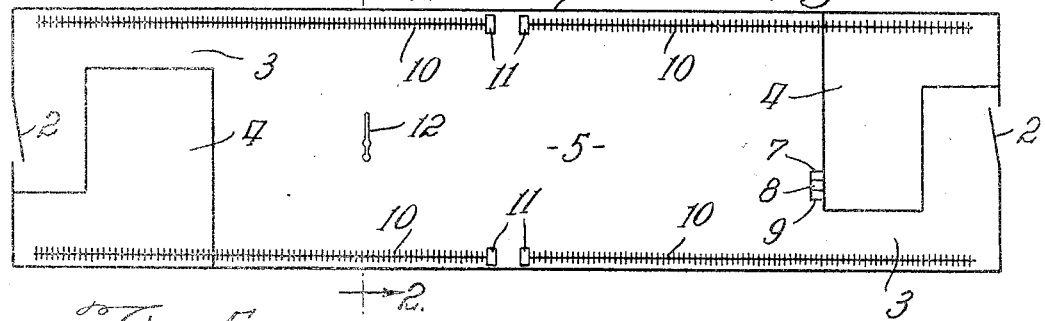
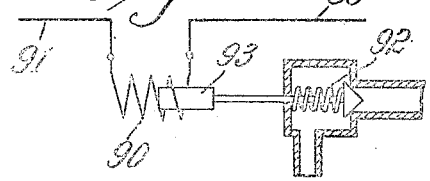
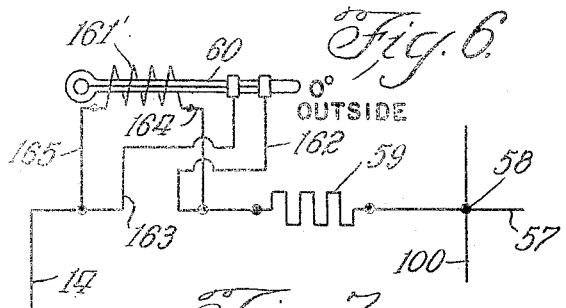
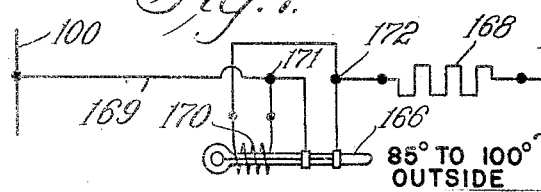
Inventors:
Timothy J. Lehane
and Everett H. Burgess
By Barnett & Truman Att'ys.

Inventors: Timothy J. Lehane and Everett H. Burgess
By- Barnett & Truman Att'ys.

Patented Apr. 11, 1944

2,346,592

UNITED STATES PATENT OFFICE 2,346,592

AUTOMATIC TEMPERATURE CONTROL SYSTEM

Timothy J. Lehane and Everett H. Burgess, Chicago, Ill., assignors to Vapor Car Heating Company, Inc., Chicago, Ill., a corporation of New York Application May 2, 1942, Serial No. 441,426

17 Claims. (Cl. 257—3)

This invention relates to certain new and useful improvements in a temperature controlling and ventilating system for an enclosed space, more particularly a railway car. Steam will generally be used as a heating medium while the ventilating and cooling mechanisms will be electrically driven. The controlling apparatus is electrically actuated under either manual control or thermostatic control, or both.

The thermostats used are preferably of the mercury-column type, each designed to function (that is complete an electric circuit therethrough) at a certain definite temperature, but in most instances the thermostat is provided with an electric heater in the form of a coil associated therewith for adding a measured amount of auxiliary heat so that the thermostat will actually function at a temperature somewhat lower than that actually prevailing in the surrounding atmosphere. The majority of the thermostats function at predetermined temperatures within the car, or other enclosed space, although there are certain thermostats which respond to atmospheric changes outside of the space.

Much of the control mechanism is positioned in or associated with a suitable control panel mounted in an accessible position within the space or car, said panel being indicated by a simplified wiring diagram in the present disclosure.

The principal object of this invention is to provide an improved temperature control and ventilating system of the general type briefly described hereinabove and disclosed more in detail in the specifications which follow.

Another object is to provide means, under manual control, for circulating air through the car, together with means for heating this air or cooling the air as prevailing temperature conditions within the space or car may require.

Another object is to provide thermostatic means responsive to outside temperature changes for adjusting the inside thermostatic means to permit the inside temperature to increase when the outside temperature falls below a predetermined minimum or rises above a predetermined maximum.

Another object is to provide means for cooling the interior space at any time that inside temperature conditions may require but preventing the use of the heating means whenever the cooling is affected.

Another object is to provide manually adjustable electrically actuated means for raising or lowering the range of temperatures at which the inside thermostats function without affecting the spacing between the individual operating temperatures.

Other objects and advantages of the invention will be more apparent from the following detailed description of certain approved forms of apparatus and electrical connections operating in accordance with the principles of this invention.

In the accompanying drawings:

Fig. 1 is a diagrammatic outline, on a small scale, of a railway car provided with this improved system.

Fig. 2 is a transverse vertical section, on a larger scale, taken substantially on the line 2—2 of Fig. 1.

Fig. 4 is a more detailed wiring diagram of the control mechanism for the "floor heat," as also shown in the upper portion of Fig. 3.

Fig. 5 is a diagram of the controlling valve for the "overhead heat."

Fig. 6 is a detail view corresponding to the upper left hand corner of Fig. 3, but showing a modification.

Fig. 7 is a similar view of a modified thermostatic selector for the cooling system.

Figure 3:
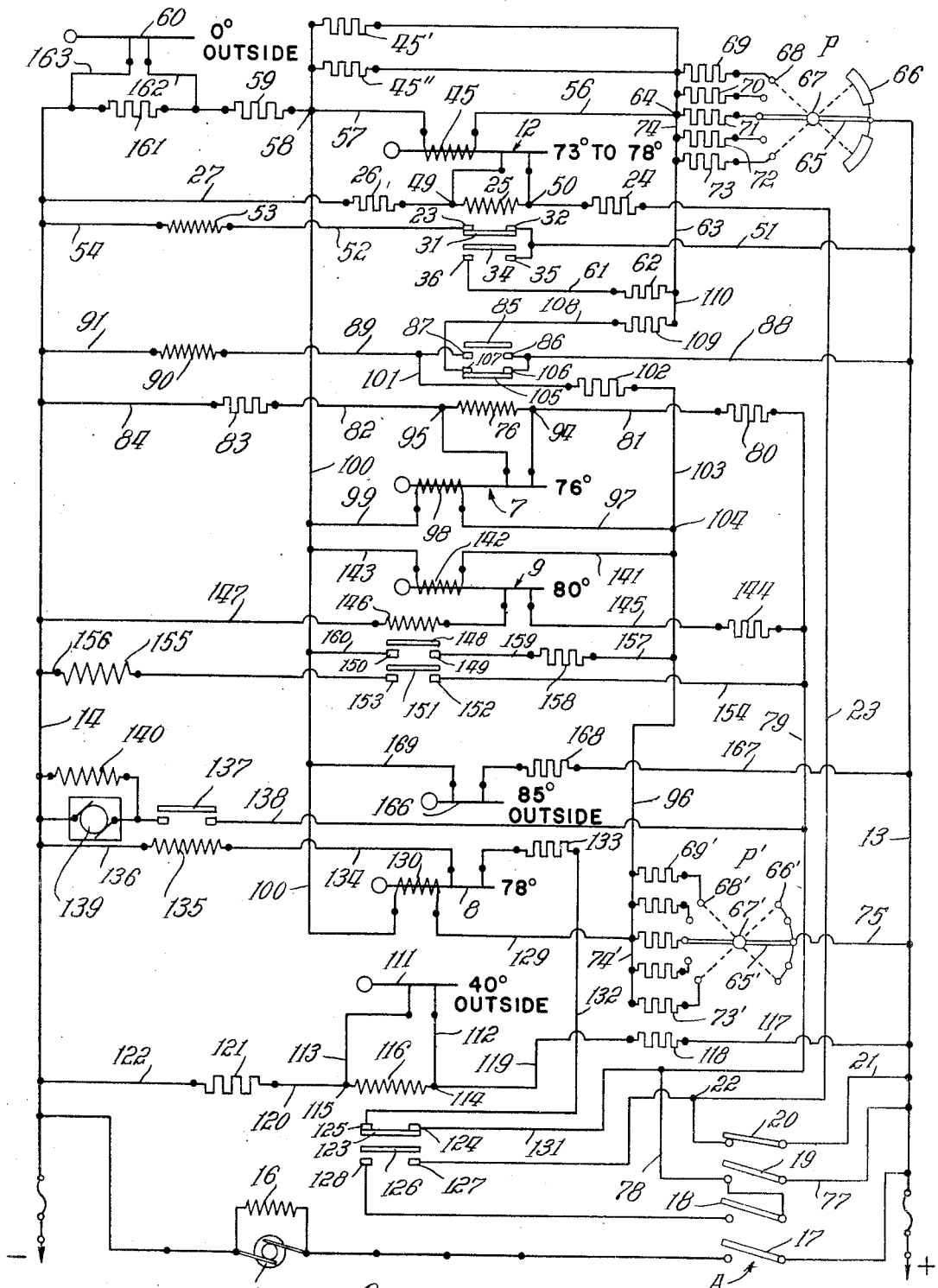
Fig. 3 is for the most part a wiring diagram of an approved form of the control system.

Referring first to Figs. 1 and 2, the railway car shown in outline at 1 is provided with normally closed doors 2 at its ends communicating through passage-ways 3 extending around the interior compartments 4 to the main interior space 5 of the car.

Ventilating air is circulated through upper conduits 6 (Fig. 2) within the car and projected through outlets in said conduits into the car and suitable heating means for this "overhead" air is provided (not here shown in detail), said heating means being under the control of a thermostat 7 positioned in the main body of the car at about the five foot level. The air in conduits 6 is also cooled when necessary by suitable refrigerating means under the control of thermostats 8 and 9 which may be situated within the car adjacent the thermostat 7. Radiators 10 are also provided in the lower side portions of the main space within the car for directly heating the air therein, the valves 11 for admitting steam to these radiators being under the control of a thermostat 12 suitably located adjacent the floor of the car. In the present arrangement the car will normally be heated by imparting heat to the circulating or "overhead" air discharged from the conduits 6, the "floor heat" from the radiators 10 being in the nature of an auxiliary heating means for providing heat when the air-circulating blower is not in operation or under extreme temperature conditions when the heating capacity of the overhead heat is inadequate. A heating system of this general type is disclosed more in detail and claimed in the copending application of the present inventors, Serial No. 427,257, filed January 19, 1942.

Referring now more particularly to Fig. 3, an approved form of controlling system will be described. The positive and negative mains 13 and 14 shown respectively at the right and left of this view are connected with the corresponding sides of a suitable source of electric energy. At the lower end of this drawing, at 15, is indicated the motor (provided with field 16) which drives the blower or fan for forcing ventilation air through the conduits 6. A blower fan switch, indicated generally at A, comprises a plurality of simultaneously operated members 17, 18, 19 and 20. This switch is manually controlled and it will be understood that when the switch members 17, 18 and 19 are open the member 20 will be closed and vice versa. When switch member 17 is closed the blower motor 15 will be energized in an obvious manner by current flowing from main 13 to main 14 at the lower end of Fig. 3.

As will be hereinafter apparent, neither the overhead heat nor the cooling system will be operative unless the blower is in operation to circulate the air, and consequently it is desirable that the "floor heat" system shall be operative at such times as the blower is not operating in order that some heat will be available at this time. Consequently the switch 20 is closed whenever the main switch is open, thus establishing a circuit from positive main 13, through wire 21, switch 20, terminal 22, wire 23, resistor 24, floor heat relay 25, resistor 26, and wire 27 to the negative main 14. The floor heat relay 25 and associated parts are shown at the upper central portion of Fig. 3, but are also shown more in detail in Fig. 4, which will first be described. As shown in Fig. 4, the relay coil 25 is de-energized so that the core 28 within said coil will be lifted by spring 29 and, through stem 30, will lift the contact plate 31 into engagement with the fixed contacts 32 and 33 and at the same time lift and disengage contact plate 34 from the fixed contacts 35 and 36. The valve 11 (see also Fig. 1) is of the "normally open" type and comprises an inlet pipe 37 leading to the valve chamber 38 and a supply pipe 39 leading from this chamber into the radiator, such as 10. The spring 40 will normally pull out the valve stem 41 and withdraw valve 42 from the entranse of pipe 39, thus permitting steam to flow to the radiators.

The floor heat thermostat 12 is of the double-bulb type comprising an upper bulb 43 exposed to the atmosphere and a lower bulb 44 provided with a surrounding electric heating coil 45. The mercury column 46 is always in engagement with a lower fixed contact 47, while at a certain functioning temperature (for example 78°) this mercury column will engage the upper fixed contact 48. It is to be assumed that the prevailing atmospheric temperature adjacent the floor of the car plus the heat added by coil 45 will cause the mercury column to engage the upper contact 48, at which time a current will flow through the thermostat 12 between the terminals 49 and 50 of the relay coil 25, thus de-energizing this coil, as shown in Fig. 4. In other words the floor heat temperature requirements are now satisfied at the location of thermostat 12. A circuit will now be completed from the positive main 13 through wire 51, contacts 32, 31 and 33, wire 52, solenoid coil 53, and wire 54 to the negative main 14. The energization of coil 53 will draw in the core 55 at the end of valve stem 41, thus causing the valve 42 to close against the opposition of spring 40 and cutting off the further flow of steam to the radiators. When the temperature at thermostat 12 falls so as to break the circuit through the thermostat at 48, the relay 25 will again be energized so as to pull down the contact 31 and break the circuit through the valve coil 53, again opening the valve 42 and admitting steam to the radiators.

The heating coil 45 on the floor heat thermostat 12 is normally energized by current flowing from positive main 13 through the selected resistor of potentiometer P (hereinafter described), wire 56, coil 45, wire 57 to terminal 58, balancing resistor 59, and outside thermostat 60 to the negative main 14. It will be assumed that this continuously flowing current will normally cause the thermostat 12 to function at the selected temperature, for example 78°. However, when the temperature has fallen somewhat and the valve has been opened as described, the contact plate 34 will be drawn down into engagement with fixed contacts 35 and 36, thus causing a current to flow from wire 51 through these contact plates, wire 61, cycling resistor 62, wire 63 to terminal 64, wire 56 and thence through the heating coil 45. This additional current will further increase the heat imparted to the thermostat by coil 45 so that the operation of the thermostat will be expedited, that is it will function at a somewhat lower temperature. This so-called "cycling" action will expedite the operation of valve 11 so that the supply of steam to the "floor heat" radiators will be cut on and off at more frequent intervals.

While the general operation of the thermostat and relay system for controlling the floor heat is more completely shown in Fig. 4, a more simplified disclosure of the same system is shown in the upper central portion of Fig. 3 and this same simplified showing is used for most of the other thermostatic assemblies hereinafter referred to, the detailed operation of which should be apparent from the similarity to Fig. 4.

The upper deck of a manually-operated potentiometer P for adjusting the functioning temperature of the floor heat thermostat 12 is shown in the upper right corner of Fig. 3, whereas the exactly similar lower deck of this potentiometer is indicated at P' near the lower right hand side of this figure. The centrally pivoted contact member 65 is always in engagement at its right hand end with the arcuate contact or series of contacts 66 which is connected with the positive main 13. Contact 65 is adjusted about its central axis by the knob or handle 67, and the left hand end of this contact is selectively engaged with any one of the arcuate series of five spaced contacts 68, which contacts form one terminal of the alternative resistors 69 to 73 inclusive which are connected in parallel at their other ends by a wire 74 which connects with one end of the wire 56 leading to the heating coil 45 on thermostat 12. It will be seen that as potentiometer P is adjusted by rotating the knob 67 one or another of the resistors 69 to 73 inclusive will be connected in series with the heater 45 thus selecting the current that will flow through coil 45 and determining the temperature at which thermostat 12 will function. What may be assumed to be the "normal" position of the potentiometer is indicated in solid lines in Fig. 3, the resistor 71 now being in series with the heater 45 and with the parts so positioned we may assume that the thermostat 12 will function at 78°. The resistors 69 to 73 are of different values so that as the controller 67 is rotated in either a clockwise or counter-clockwise direction, the amount of heat added to the therrmostat 12 will be raised or lowered so as to selectively adjust the functioning temperature of this thermostat.

It will be noted that resistors 45' and 45" (having the same resistance as the heater 45) are arranged in similar circuits parallel thereto so that the current flowing through each of these parallel circuits will be the same at all times. It will be understood that in the simple example here shown only one floor heat thermostat 12 is illustrated, but the floor heat radiators might be divided into as many as three groups, in which case the heaters for the other two thermostats would be indicated by the resistors 45' and 45". Of course, each of these heaters would be associated with a thermostat and cooperating relay similar to the ones shown in Figs. 3 and 4 and energized through parallel circuits.

The lower deck P' of the potentiometer P may be exactly the same as the upper deck, both decks being actuated by the same manually operated controller 67. The individual parts of the lower deck P' are indicated by the same reference characters primed as are shown on potentiometer P. The right hand row of contacts on deck P' are energized from main 13 through the wire 75. The lower deck P' adjusts the heaters for the "overhead thermostat" 7 and the two cooling thermostats 8 and 9, already referred to. The arrangement of the manual potentiometer in two simultaneously operated decks P and P', each adjusting the heaters for three controlling thermostats is for the purpose of properly balancing the wiring system.

As will be more apparent hereinafter, each of the several thermostats hereinabove mentioned is adapted to function at a certain definite temperature inside the space or car, or a certain temperature to which this thermostat is adjusted by the potentiometer P. It will be noted that the adjustments accomplished by this potentiometer moves the entire scale of these functioning temperatures either up or down so that the relative arrangement of these temperatures and the spacing therebetween is not affected by the movement or adjustment of the potentiometer. The additional adjustments of the inside thermostat by the "cycling" resistors or by the outside thermostat as described elsewhere herein, are not dependent upon the potentiometer P which merely serves to adjust the entire range of operating temperatures either up or down as may prove to be desirable.

The overhead heat relay 76 (see upper center of Fig. 3) will normally be energized (when fan switch A is closed) by the following circuit: from positive main 13 through wire 77, switch 19, wire 78, wire 79, resistor 80, wire 81, relay coil 76, wire 82, resistor 83 and wire 84 to the negative main 14. When the relay 76 is thus energized it will draw the movable contact 85 into engagement with the fixed contacts 86 and 87, thus completing a valve-energizing circuit as follows: from main 13 through wire 88, relay contacts 86, 85 and 87, wire 89, solenoid coil 90, and wire 91 to the negative main 14. The overhead heat valve differs from the valve shown in Fig. 4 in that it is normally closed by spring 92 (Fig. 5) but when solenoid 90 is energized (through the circuit last described) it will draw in the core 93 and open the valve in opposition to the spring 92. When the predetermined functioning temperature (for example 76°) is reached at the overhead thermostat 7 a short circuit will be formed through this thermostat between the relay terminals 94 and 95 at the ends of relay coil 76, thus de-energizing this relay and permitting the contact 85 to open, thus breaking the circuit through solenoid coil 90 and permitting the overhead steam valve to close. In other words the overhead heat will remain in operation as long as the effective inside temperature at thermostat 7 is below 76° but will cease operation when the inside temperature rises above 76°.

The overhead heat thermostat 7 is provided with an adjusting heating coil 98 energized through the following circuit: from positive main 13 through wire 75, potentiometer P', wire 96, wire 97, heater 98, wires 99 and 100 to the terminal 58 and thence as before to the negative main 14. When the inside temperature is below the normal functioning temperature of thermostat 7 (for example 76°) and the relay 76 is energized so as to draw down the bridge contact 85, so that the overhead valve will be open to admit steam to the system, another circuit will be completed from main 13, wire 88, and relay contacts 86, 85 and 87, through wire 101, cycling resistor 102, wire 103, to terminal 104 and thence as before through wire 97 and the thermostat heater 98. This temporarily operating auxiliary parallel circuit will permit additional current to flow through the heater 98 and as a result, somewhat lower the functioning temperature of the thermostate 7, but as soon as the valve is closed and the relay contacts are again separated, the original current will again be restored in heater 98 and the thermostat will again function at 76°.

When the overhead valve is closed and the relay 76 is de-energized, another relay contact 105 will be moved into engagement with the pair of fixed contacts 106 and 107, thus completing another partial circuit as follows: from main 13, through wire 88 and relay contacts 106, 105 and 107, through wire 108, cycling resistor 109, and wires 110, 63 and 56 to the heater 45 on thermostat 12. This will provide an additional path of current to the heater 45 so that this floor heat thermostat 12 will function at a somewhat lower temperature providing the necessary floor heat circuits are otherwise completed. This "cycling" connection expedites the operation of the floor heat at such times as the overhead heat is off and vice versa. In other words, as long as the temperature is above 76° and the overhead heat is "off," current will flow through resistor 109 to the heater 45 on the floor-heat thermostat 12 and that thermostat will function at a lower effective temperature (such as 73°) so as to keep the floor heat "off" until the car temperature falls below 73°. Before this can occur the temperature will drop below 76° and the overhead heat will be turned "on." At this time the circuit through resistor 109 will be broken and the current reduced through heater 45 so that the effective temperature at heater 45 will be lowered and the functioning temperature of thermostat 12 will be raised toward the normal temperature of 78° for which it is designed. In short, the greater the proportion of the time that the overhead heat is in operation, the higher the minimum temperature at which the floor-heat will function, although the overhead heat will always be called upon first to satisfy the heat requirements if these are within its capacity.

Assuming that the relay 76 is deenergized for any reason, as when the actual inside car temperature is about 76°, the resistor 109 will be effective to cause the floor-heat thermostat 12 to function at 73°, that is floor heat will be active below 73° but will be turned off when the car temperature rises above 73°.

At 111 (lower central portion of Fig. 3) is shown an "interlock" thermostat which is positioned outside the car so as to function at a predetermined exterior temperature (for example 40°) to complete a circuit therethrough to short circuit an "interlock" relay through the wires 112 and 113 connecting the mercury column with the terminals 114 and 115 at the ends of relay coil 116. Therefore at all outside temperatures above 40° a circuit will be completed from positive main 13, through wire 117, resistor 118, wire 119, thermostat 111, wire 120, resistor 121 and wire 122 to the negative main 14. At such times the relay coil 116 will not be energized and the bridging contact 123 will be in engagement with the fixed contacts 124 and 125. At this time the contact 126 will be lifted out of engagement with the fixed contacts 127 and 128. On the other hand, when the temperature at thermostat 111 falls below 40° the circuit through this thermostat will be broken and the relay 116 will be normally energized to draw down contact 126 into engagement with the fixed contacts 127 and 128 and to move the bridging contact 123 out of engagement with contacts 124 and 125.

It will be first assumed that the cooling thermostat 8 normally functions at 78°, that is if the inside temperature rises above 78°, this thermostat will endeavor to place the cooling system in operation. A heating circuit for this thermostat will flow from main 13, through wire 75 and potentiometer P' to and through wire 129 and heating coil 130 on thermostat 8 and thence through wire 100 as before, to the terminal 58. It will be assumed that when this current is flowing the thermostat 8 will function at 78° to complete the following circuit therethrough: from arm 19 of switch A, through wire 78, wire 131, relay contacts 124, 123 and 125, wire 132, resistor 133, thermostat 8, wire 134, relay 135, and wire 136 to the negative main 14. The energization of relay 135 will draw down the contact 137, thereby completing a circuit through wire 138 extending from wire 79 to the negative main. This will close a circuit through the refrigerator motor 139 so as to actuate the refrigerating system, and will also energize the solenoid 140 which opens the valve admitting refrigerant to one section of the evaporator or cooling coil. In other words, as long as the space temperature is about 78° the refrigerator motor will be in operation and refrigerant will be admitted to a portion of the evaporator. This operation will continue until the temperature again falls below 78°, whereupon the cooling system will be stopped.

The cooling system herein disclosed is of the type more fully disclosed and claimed in the copending application of the same inventors, Serial No. 427,258, filed January 19, 1942. This system comprises a "split evaporator," the first section of which is normally used whenever cooling is required (as disclosed hereinabove), the second section being only used when the first section is insufficient to satisfy the temperature requirements. This second section is controlled by the thermostat 9 which does not function until an effective space temperature of 80° is reached. Thermostat 9 is provided with an auxiliary heating coil 142 energized through a circuit extending from wire 96, through wire 141, heater 142 and wire 143 to the wire 100. The temperature prevailing in the space plus the heat added by coil 142 will cause thermostat 9 (at 80° for example) to close a circuit extending from wire 79 through resistor 144, wire 145, thermostat 9, relay coil 146, and wire 147 to the negative main 14. The energization of coil 146 will move the contact 148 into engagement with the fixed contacts 149 and 150 and will also move the second contact 151 into engagement with the fixed contacts 152 and 153. The closing of this second set of contacts will complete a circuit from wire 79 through wire 154, the relay contacts and solenoid coil 155, through wire 156 to the negative main 14. The coil 155 will open the valve to the second section of the evaporator. It will be understood that the compressor 139 is still in operation since the first section of the evaporator is still operating. At the same time the relay 146 will cause a second circuit to be completed from wire 96 through wire 157, cycling resistor 158, wire 159, contacts 149, 148 and 150, and wire 160 to the wire 100. This will provide a second path for the current from wire 96 to wire 100, in parallel with the circuit through heater 142, so that the current flow through heater 142 will be reduced and consequently the functioning temperature of thermostat 9 will be temporarily lowered. This will expedite the closing of the valve controlled by coil 155 so that this auxiliary section of the evaporator will have a "cycling" operation.

It will be noted that the heating currents for both cooling thermostats 8 and 9, as well as for the "overhead heat" thermostat 7 all flow through the lower deck P' of the manually operated potentiometer and are simultaneously and proportionately adjusted thereby at the same time that the floor heat thermostats are controlled by the other deck P of this potentiometer. It will now be noted that all of these thermostats controlling heating circuits flow eventually through the same terminal 58 (upper left of Fig. 3) and thence through the resistances 59 and 161 in series to the negative main 14, as long as the temperature outside of the space is below 0°. As has already been described, the thermostat 60 is adapted to function at (for example) 0° to close a bridging circuit through wires 162 and 163 around the resistance 161. Therefore the resistance 161 will not normally be in the heating circuit but below 0° this resistance 161 will be added to all of the heating circuits so as to decrease the heating current applied to all of the thermostats and therefore raise the effective temperatures at which heat will be cut off at each of these thermostats.

A modification of this portion of the system is shown in Fig. 6 which is to be substituted for the partial circuits shown in the upper left hand corner of Fig. 3. The structure is the same as previously described with the exception that for the resistor 161 a heating coil 161' associated with the thermostat 60 is substituted. When the outside temperature at this thermostat 60 falls below 0° the thermostat will break the circuit through wires 162 and 163 and instead the circuit will now flow through wire 164, heating coil 161' and wire 165. It will be understood that the coil 161' will function the same as the resistor 161, previously described, to add resistance in the heating circuits while at the same time it will impart heat to the thermostat 60 so as to raise its functioning temperature. For example this coil may add 20° of heat to the thermostat 60 so that the thermostat will actually close its circuit at —20° instead of 0° for which it is designed. Therefore, at the actual outside temperature of 0° the thermostat 60 will act to place the resistor 161' in the circuit, but this resistor acting as a heater will at once again close the circuit through the thermostat so as to short-circuit the coil 161' and restore the original current through the heating circuits. This cycling operation will repeat itself at less frequent intervals as the actual outside temperature falls further below 0° until the actual temperature has fallen below —20°, whereupon the circuit through the thermostat will remain broken in spite of the heater 161' so that this heater will remain continuously in the circuits and the heating current for the other heat controlling thermostats will remain continuously decreased as long as the outside temperature is below —20°.

A cooling selector thermostat 166 (lower central portion of Fig. 3) is located outside of the enclosure so as to be responsive to the prevailing outside temperature and is in a circuit extending from the positive main 13 through wire 167, resistor 168, thermostat 166, and wire 169 to the wire 100. Accordingly, when a predetermined temperature (for example 85°) is reached outside of the car, this circuit will be completed so as to place the resistor 168 in parallel with the adjusting potentiometer P' thus decreasing the effective currents in the heaters for the cooling thermostats, that is the cooling system will not become effective until slightly higher inside temperatures are reached. This is desirable since the inside temperature should be permitted to rise somewhat as the outside temperature increases, that is there should not be too much difference between the inside and outside temperatures. In the present example, the inside temperature is permitted to become somewhat higher when the outside temperature rises above 85°.

A modification of this portion of the system is indicated in Fig. 7. This showing is similar to the cooling selector circuit just described. A heating coil 170 is applied to the thermostat 166 and is connected in parallel with this thermostat across the terminals 171 and 172.

At those outside temperatures below (for example) 100° there will normally be no circuit completed through the thermostat but a small amount of current will continuously flow through the resistances 170 and 168 in series. The resistance 170 is so designed that this heater will add approximately 15° of heat to the thermostat so that it will start to function at an actual outside temperature of 85°. At this effective temperature of 100° the thermostat will then function as if the outside temperature were 85° so that the circuit will be completed through the thermostat and the heating coil 170 will be temporarily de-energized. The current then flowing through the resistor 168 will be sufficient to materially change the setting of the cooling thermostats 8 and 9 so that a greater degree of heat will be permitted within the car space. However, the effective temperature at thermostat 166 will immediately be lowered since the heating coil 170 is no longer energized and consequently the resistance 170 will be restored to the circuit thus again cutting down the current through this shunt circuit to a negligible minimum. In other words the thermostat 166 will again function at an actual outside temperature of 100° instead of 85°. This "cycling" operation will repeat itself as long as the actual outside temperature remains below 100°, but above 100° the thermostat 166 will remain continuously closed. In short, between 85° and 100° outside temperature the permissible inside temperature will be progressively raised, the cooling system being least effective at 100°.

Referring now again to the general operation of the system as disclosed in Fig. 3, the control apparatus is in general responsive to changes in the prevailing temperature within the car. Assuming first that the blower switch A is closed and that the inside temperature is above 76° but below 78°, the air circulation system will continue to operate but only for ventilating purposes since this air is neither being cooled or heated. Assuming that the inside temperature rises to 78°, or above, the refrigeration motor 139 will be started and the first unit of the cooling system will be put in service. If this first unit proves to be insufficient to lower the temperature below 78° and the temperature continues to rise to 80° or above, the second unit of the cooling system will be put in service under the intermittent cycling control of the resistor 158. Both units of the cooling system will operate until the inside temperature falls below 80°, and the first unit will continue until the inside temperature has fallen below 78°, whereupon the cooling system will cease to function. If, during this time, the outside temperature should rise to 85° or above, the inside temperature will be permitted to rise somewhat higher than 80° so as not to maintain too great a difference between the inside and outside temperatures.

On the other hand, assuming that the inside temperature should fall below 76° from the intermediate ventilating range first described, the "overhead heat" will then be put in operation under the control of thermostat 7 and ordinarily this overhead heat only will be used to restore the necessary temperature within the car unless the outside temperature should fall below 40°, whereupon the interlock thermostat 111 would permit the floor heat thermostat 45 to put the floor heat radiation in service below an inside temperature of 73°. It will be understood that if (regardless of the outside temperature) the switch A should be opened and the air circulation stopped, the floor heat will be effective at or below 73° inside temperature to heat the space within the car. If at any time the outside temperature should fall below 0°, the current in the heat-control thermostat circuits will be temporarily adjusted so as to permit the heating systems to maintain a somewhat higher temperature within the car.

In the above description the inside control temperatures assumed by way of example have been referred to, but it is to be noted that this entire range of inside controlling temperatures can be raised or lowered within certain limits by the use of the manual potentiometers P and P'.

Figure 8:
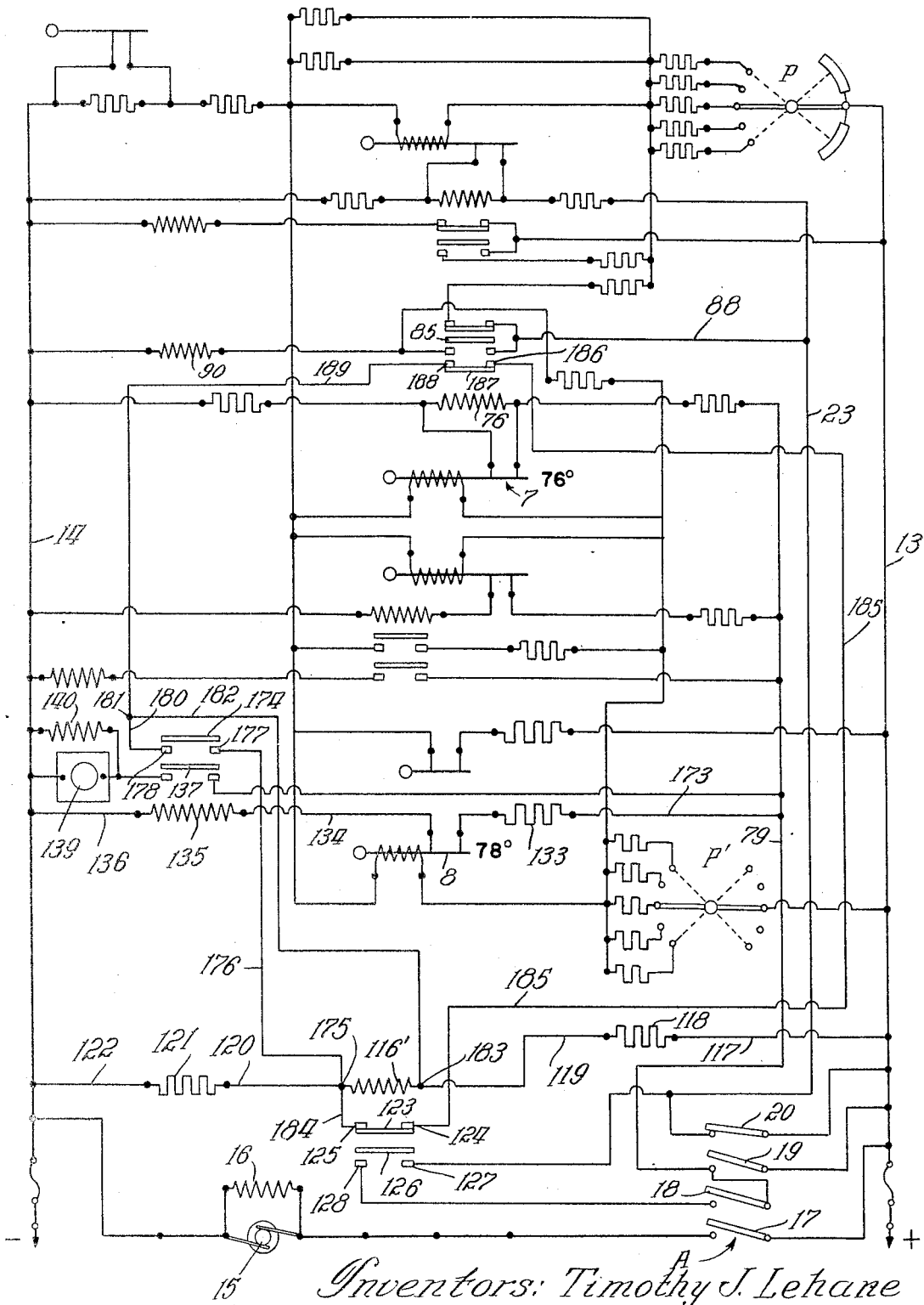
Fig. 8 is a wiring diagram, similar to Fig. 3, showing certain modifications in the controlling circuits.

In Fig. 8 is illustrated a modification of the controlling system in which the outside "interlock" thermostat 111 is omitted so that the outside temperature has no direct control over the change from the heating to the cooling side of the system. Both the heating and cooling are dependent upon the temperatures prevailing within the space, and the cooling system is operative at any time, regardless of the prevailing outside temperature, providing the inside temperature calls for cooling and the ventilating blower is in operation. Most parts shown in Fig. 8, which are not specifically referred to hereinafter, are the same as has already been described in connection with Fig. 3. As already described, the "interlock" thermostat 111 is omitted but the controlled relay 116' is the same as the relay 116 shown in Fig. 3 and is normally energized through the same circuit as before. The first cooling thermostat 8 now completes a circuit extending directly from wire 79, through wire 173, resistor 133, thermostat 8, wire 134, solenoid coil 135, and wire 136 to the main 14 so that at 78° inside temperature the coil 135 will be energized to draw down the contact 137 and complete the circuits through the refrigerating motor 139 and the valve-opening solenoid 140 for the first unit of the evaporator. The cooling relay 135, in addition to the contact 137, already described, operates a second contact 174 so that when the cooling system is started another circuit will be completed to de-energize the normally energized relay 116', as follows: from one terminal 175 of relay 116', through wire 176 to fixed contact 177, movable contact 174, fixed contact 178, wire 180 to terminal 181, and wire 182 to the other terminal 183 of relay 116'. Since 116' is now de-energized, the contact 126 will be drawn out of engagement with the fixed contacts 127 and 128 so that the circuit through wire 23 to the floor heat control system will be broken at contact 128 and the floor heat will not be operative while the blower fan switch A is closed (that is while contact 20 is open). At the same time a "holding" circuit will be completed from terminal 175, through wire 184, relay contacts 125, 123 and 124, wire 185, additional contacts 186, 187, and 188 of the "overhead heat" relay 76, wire 189, terminal 181, and wire 182 to the other terminal 183 of relay coil 116'. The new movable contact 187 of the overhead heat relay 76 will now be closed since the temperature is above 76° (the cooling system is in operation). Therefore, this "holding circuit" will remain closed to de-energize the relay 116' even though the contact 174 of relay 135 should open, due to the cooling system being satisfied by the temperature falling slightly below 78°. Even though the inside temperature is above 76°, the overhead heating system cannot operate since the wire 88 leading to the overhead heat valve 90 extends (in this modification) from the wire 23, which is now de-energized. From the time that the action of the first cooling relay has closed the contact 174 until the "holding circuit" is broken by the space temperature falling below 76° (thus again energizing the overhead heat relay 76, so as to open the relay contact 187) the interlock relay 116' will remain de-energized so as to hold both heating mechanisms out of service. In short, the cooling system will be operative at any time, regardless of the outside temperature, providing the blower fan is in operation and the inside temperature is above 78°, and no part of the heating system can operate until the inside temperature again falls below 76°. It will be understood that all of the temperatures just referred to assume a fixed setting of the potentiometers P and P'. The scale of these controlling temperatures can be raised or lowered by a suitable adjustment of these potentiometers.

We claim:

1. In combination with temperature regulating apparatus comprising means for supplying heat to or withdrawing heat from a space, and control mechanism comprising a plurality of thermostats each adapted to function at a predetermined space temperature to cause a portion of said apparatus to operate or cease to operate, an electric heater cooperating with each thermostat to selectively determine the functioning temperature of that thermostat, heater-energizing circuits connected in parallel with one another and a manually operable potentiometer adapted to connect the same selected resistance in series with each of these heaters whereby the entire scale of functioning temperatures is adjusted up or down without changing the spacing between the functioning temperatures of the several thermostats.

2. In combination with temperature regulating apparatus comprising means for supplying heat to or withdrawing heat from a space, and control mechanism comprising a plurality of thermostats each adapted to function at a predetermined space temperature to cause a portion of said apparatus to operate or cease to operate, an electric heater cooperating with each thermostat to selectively determine the functioning temperature of that thermostat, heater-energizing circuits connected in parallel with one another and a manually operable potentiometer adapted to connect the same selected resistance in series with each of these heaters whereby the entire scale of functioning temperatures is adjusted up or down without changing the spacing between the functioning temperatures of the several thermostats, a resistance in series with certain of the heaters when energized and decreasing the current thereto, and a thermostat functioning at a predetermined temperature outside the space to short-circuit this resistance and increase the temperature at the heaters.

3. In combination with temperature regulating apparatus comprising means for supplying heat to or withdrawing heat from a space, and control mechanism comprising a plurality of thermostats each adapted to function at a predetermined space temperature to cause a portion of said apparatus to operate or cease to operate, an electric heater cooperating with each thermostat to selectively determine the functioning temperature of that thermostat, heater-energizing circuits connected in parallel with one another and a manually operable potentiometer adapted to connect the same selected resistance in series with each of these heaters whereby the entire scale of functioning temperatures is adjusted up or down without changing the spacing between the functioning temperatures of the several thermostats, a circuit in parallel with certain heater-energizing circuits, a resistor in said parallel circuit adapted to decrease the current in the heater-energizing circuits, and a thermostat functioning at a predetermined maximum temperature outside the space to close said parallel circuit.

4. In combination with temperature regulating apparatus comprising means for supplying heat to or withdrawing heat from a space, and control mechanism comprising a plurality of thermostats each adapted to function at a predetermined space temperature to cause a portion of said apparatus to operate or cease to operate, an electric heater cooperating with each thermostat to selectively determine the functioning temperature of that thermostat, heater-energizing circuits connected in parallel with one another and a manually operable potentiometer adapted to connect the same selected resistance in series with each of these heaters whereby the entire scale of functioning temperatures is adjusted up or down without changing the spacing between the functioning temperatures of the several thermostats, a resistance in series with certain of the heaters when energized and decreasing the current thereto, and a thermostat functioning at a predetermined temperature outside the space to short-circuit this resistance and increase the temperature at the heaters, a circuit in parallel with certain heater-energizing circuits, a resistor in said parallel circuit adapted to decrease the current in the heater-energizing circuits, and a thermostat functioning at a predetermined maximum temperature outside the space to close said parallel circuit.

5. In combination with apparatus for supplying heat to a space, a thermostat adapted to function at a predetermined space temperature to control said apparatus, an electric heater cooperating with the thermostat to selectively determine the functioning temperature of the thermostat, a resistance in series with the heater to decrease the heating current thereto, and a thermostat functioning at a predetermined temperature outside the space to short-circuit said resistance and thus increase the temperature of the heater.

6. In combination with apparatus for supplying heat to a space, a thermostat adapted to function at a predetermined space temperature to control said apparatus, an electric heater cooperating with the thermostat to selectively determine the functioning temperature of the thermostat, a resistance in series with the heater to decrease the heating current thereto, and a thermostat functioning at a predetermined temperature outside the space to short-circuit said resistance and thus increase the temperature of the heater, said resistance being closely associated with the last mentioned thermostat and serving when energized to add heat thereto and thus expedite the operation of the thermostat.

7. In combination with apparatus for withdrawing heat from a space, a thermostat adapted to function at a predetermined temperature to control said apparatus, an electric heater cooperating with said thermostat to selectively determine the functioning temperature of the thermostat, a heater-energizing circuit, a circuit in parallel with said energizing circuit, a resistor in said parallel circuit adapted to determine the decrease in the heating current in said heater when the parallel circuit is completed, and a thermostat functioning at a predetermined maximum temperature outside the space to close said parallel circuit.

8. In combination with apparatus for withdrawing heat from a space, a thermostat adapted to function at a predetermined temperature to control said apparatus, an electric heater cooperating with said thermostat to selectively determine the functioning temperature of the thermostat, a heater-energizing circuit, a circuit in parallel with said energizing circuit, a resistor in said parallel circuit adapted to determine the decrease in the heating current in said heater when the parallel circuit is completed, a thermostat functioning at a predetermined maximum temperature outside the space to close said parallel circuit, and a heating coil for said latter thermostat connected in said parallel circuit in series with the resistor.

9. In combination with apparatus for circulating air through a space, apparatus for heating said air, apparatus for withdrawing heat from said air and apparatus for directly adding heat to the air within said space, control means responsive to the temperature of the air in the space at a plurality of spaced temperatures for controlling said apparatuses, each control means comprising a thermostat and an electric heater for adjusting the functioning temperature thereof, and means comprising a thermostat responsive to changes in the temperature of the outside air and a relay controlled by said outside thermostat for cooperating with the inside thermostats to render the cooling means inoperative and both heating means operative below a predetermined outside temperature, and rendering the circulating air heating means and the cooling means operative but the direct heating means inoperative above said outside temperature.

10. In combination with apparatus for circulating air through a space, apparatus for heating said air, apparatus for withdrawing heat from said air, and apparatus for directly adding heat to the air within ssaid space, control means responsive to the temperature of the air in the space at a plurality of spaced temperatures for controlling said apparatuses, each control means comprising a thermostat and an electric heater for adjusting the functioning temperature thereof, and means cooperating with the circulating air heating and cooling means and responsive only to inside temperature changes for rendering both heating means inoperative when the cooling means is operative.

11. In combination with apparatus for circulating air through a space, apparatus for cooling said air, apparatus for heating said circulated air, and apparatus for directly adding heat to the air within the space, thermostatic control means responsive to changes in the temperature of the air within the space for successively actuating said apparatuses, and means actuated by the combined action of the control means for the cooling apparatus and the control means for the first-mentioned heating apparatus to prevent the effective operation of either heating means while the inside temperature calls for cooling.

12. In combination with a primary means for heating the air within a space, secondary means for heating said air, control means for each said heating means each comprising a thermostat, a relay, and an electric heater for regulating the functioning temperature of the thermostat, said electric heater being controlled from the relay, the primary heating means being operative below a predetermined space temperature, and the secondary heating means being operative, along with the primary heater, below a predetermined lower temperature, said electric heaters operating independently to vary the functioning temperature of each thermostat, and a circuit also controlled by the relay of said primary heating means for lowering the functioning temperature of the secondary heating means at such times as the primary means is not in operation.

13. In combination with a primary means for heating the air within a space, secondary means for heating said air, control means for each said heating means each comprising a thermostat, a relay, and an electric heater for regulating the functioning temperature of the thermostat, said electric heater being controlled from the relay, the primary heating means being operative below a predetermined space temperature, and the secondary heating means being operative, along with the primary heater, below a predetermined lower temperature, said electric heaters operating independently to vary the functioning temperature of each thermostat, and a circuit also controlled by the relay of said primary heating means for adding current to the electric heater for the secondary thermostat to lower the functioning temperature for the secondary heating means.

14. In combination with a primary means for heating the air within a space, secondary means for heating said air, control means for each said heating means comprising a thermostat, the primary heating means being operative below a predetermined space temperature, and the secondary heating means being operative, along with the primary means, below a predetermined lower temperature, and means also controlled by the control means for the primary heating means for lowering the functioning temperature of the secondary heating means when the primary means is not in operation.

15. In combination with a primary means for heating the air within a space, secondary means for heating said air, control means for each said heating means comprising a thermostat, the primary heating means being operative below a predetermined space temperature, and the secondary heating means being operative, along with the primary means, below a predetermined lower temperature, and means also controlled by the control means for the primary heating means for increasing the operating range of the secondary heating means as the period of operation of the primary heating means is lengthened.

16. In combination with a primary means for heating the air within a space, secondary means for heating said air, control means for each said heating means each comprising a thermostat, a relay, and an electric heater for regulating the functioning temperature of the thermostat, said electric heater being controlled from the relay, the primary heater being operative below a predetermined space temperature, and the secondary heating means normally being operative, along with the primary heater, below a predetermined lower temperature, said electric heaters operating independently to vary the functioning temperatures of each thermostat, and a circuit also controlled by the relay of said primary heating means for lowering the functioning temperature of the secondary heating means at such times as the primary heating means is not in operation, and raising the functioning temperature of the secondary heating means when the primary means is in operation.

17. In combination with a primary means for heating the air within a space, secondary means for heating said air, control means for each said heating means each comprising a thermostat, a relay, and an electric heater for regulating the functioning temperature of the thermostat, said electric heater being controlled from the relay, the primary heater being operative below a predetermined space temperature, and the secondary heating means normally being operative, along with the primary heater, below a predetermined lower temperature, said electric heaters operating independently to vary the functioning temperatures of each thermostat, and a circuit also controlled by the relay of said primary heating means for lowering or raising the functioning temperature of the secondary heating means in proportion to the relative lengths of time that the primary heating means is out of or in operation.

TIMOTHY J. LEHANE.
EVERETT H. BURGESS.